United States Patent
Sundar et al.

(10) Patent No.: US 11,924,105 B1
(45) Date of Patent: Mar. 5, 2024

(54) METHOD AND APPARATUS FOR CONTROL OF CONGESTION IN STORAGE AREA NETWORK

(71) Applicant: Marvell Asia Pte Ltd, Singapore (SG)

(72) Inventors: Gourangadoss Sundar, Irvine, CA (US); Arun Easi, Pleasanton, CA (US); Girish Basrur, Irvine, CA (US)

(73) Assignee: Marvell Asia Pte Ltd, Singapore (SG)

( * ) Notice: Subject to any disclaimer, the term of this patent is extended or adjusted under 35 U.S.C. 154(b) by 36 days.

(21) Appl. No.: 17/661,174

(22) Filed: Apr. 28, 2022

Related U.S. Application Data

(60) Provisional application No. 63/181,793, filed on Apr. 29, 2021.

(51) Int. Cl.
*H04L 47/12* (2022.01)

(52) U.S. Cl.
CPC .................................. *H04L 47/12* (2013.01)

(58) Field of Classification Search
CPC ..... H04L 69/22; H04L 49/90; H04L 67/1097; H04L 47/12; H04L 47/24; H04L 49/30; H04L 47/26; H04L 47/30; H04L 47/11; H04L 47/18; H04L 49/3018; H04L 49/101; H04L 47/2441; H04L 47/263; H04L 47/6275; H04L 49/9005; H04L 47/122; H04L 47/32; H04L 47/34; H04L 47/39; H04L 49/3009; H04L 47/2483; H04L 49/3027; H04L 47/20; H04L 49/9047; H04L 69/28; H04L 43/0876; H04L 45/24; H04L 47/125; H04L 1/0083; H04L 43/10; H04L 45/38; H04L 45/46; H04L 45/566; H04L 47/629; H04L 45/021; H04L 45/028; H04L 45/122; H04L 45/123

See application file for complete search history.

(56) References Cited

U.S. PATENT DOCUMENTS

| | | | |
|---|---|---|---|
| 5,457,687 A * | 10/1995 | Newman | H04Q 11/0478 370/232 |
| 11,075,847 B1 * | 7/2021 | Kwan | H04L 47/2441 |
| 11,269,670 B2 * | 3/2022 | Chou | G06F 3/061 |
| 2014/0237156 A1 * | 8/2014 | Regula | G06F 13/4027 710/314 |
| 2021/0181989 A1 * | 6/2021 | Jung | G06F 3/067 |
| 2022/0342831 A1 * | 10/2022 | Charles | G06F 9/45533 |

* cited by examiner

*Primary Examiner* — Djenane M Bayard

(57) ABSTRACT

In a storage area network operating in accordance with a transport-level protocol to interconnect host and target devices, where the transport-level protocol issues congestion notifications when any of the host or target devices becomes congested, a method for reducing congestion includes, on receipt of a request to (a) write data to one of the target devices or (b) read data from one of the target devices for return to one of the host devices, (A) determining whether congestion already exists at (a) the target device to which the write request is directed, or (b) the host device to which data from the read request is to be returned, and (B) when a congestion state already exists, comparing current depth of a queue of write or read requests to a maximum permissible queue depth. When the current depth of the queue exceeds a maximum permissible queue depth, the request is rejected.

16 Claims, 3 Drawing Sheets

METHOD AND APPARATUS FOR CONTROL OF CONGESTION IN STORAGE AREA NETWORK

CROSS REFERENCE TO RELATED APPLICATION

This disclosure claims the benefit of, commonly-assigned U.S. Provisional Patent Application No. 63/181,793, filed Apr. 29, 2021, which is hereby incorporated by reference herein in its entirety.

FIELD OF USE

This disclosure relates to management of read/write requests in a network storage environment. More particularly, this disclosure relates to reduction of congestion in storage area networks caused by individual resources, by controlling the number of requests that may be directed to an individual resource.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the subject matter of the present disclosure.

A storage area network (SAN) may connect a plurality of host devices to a plurality of "target" storage devices. While each target device may be a single physical device occupying a single port on the SAN, the target device may include a plurality of physical storage units (e.g., hard disk drives) within a single housing, or a single physical storage unit with a plurality of partitions, where each physical storage unit or partition constitutes a separate logical unit or namespace. Transfer of information units (IUs, which are transport units incorporating a storage command, data and a status indicator) between a host device and a logical unit or namespace connected to a SAN may be accomplished by "packing" and "unpacking" the IUs and transporting them from the source to the destination through multiple storage protocol layers. For example, a read/write request originating from an application may first be routed to a higher storage protocol layer—e.g., the "upper" or "block" layer of the SCSI (Small Computer System Interface) or NVMe (Non-Volatile Memory Express) protocol, where information regarding which location of the physical medium (e.g., hard disk or solid-state drive (SSD)) the data is to be read from or written to is determined and encoded. This "package" is passed to a middle layer, which might determine how many paths to the target device exist, and then select one of those paths and pass the package down to a separate lower transport protocol layer—e.g., a Fibre Channel or iSCSI (Internet Small Computer System Interface) layer which might be responsible for transporting the IU across the SAN to the destination target device. At the target device, the IU package then gets unpacked by the lower transport layer and handed over to the upper layer of the SCSI protocol. The upper layer decodes the read/write request and the physical location (from which data is to be read or to which data is to be written), processes the request, and returns the status and or data back across the various layers of the storage protocol to the requestor at the host.

Typical flow controls operate at the storage protocol layer, and limit data requests between a host and logical unit (or namespace) that is congested (or vice-versa). However, even if no logical unit (or namespace) in a target device is congested, so that no limits are imposed at the upper or middle storage protocol layer on the transport of information units (IUs, which are transport units incorporating a storage command, data, and a status indicator), a target device as a whole may be congested. For example, all logical units (or namespaces) in a particular target device may be operating just under the congestion threshold, so that the target device in the aggregate is congested, even though no individual logical unit (or namespace) in the target device is congested and there are no IU transport restrictions in place at the storage layer. In another example, a target device may be congested at the lower protocol layer that handles transport, but there may be no mechanism for relaying a congested state from the transport/lower layer to the upper or middle "application" layer of the storage protocol. As a further example, insofar, as a host device might be placing requests to multiple target devices, it is possible for the host device to become "congested" when data arrives from all of the target devices simultaneously.

SUMMARY

According to implementations of the subject matter of this disclosure, in a storage area network including a first plurality of host devices, a second plurality of target devices, and a network fabric operating in accordance with a transport-level protocol to interconnect the first plurality of host devices and the second plurality of target devices, for transport of requests from host devices in the first plurality of host devices to target devices in the second plurality of target devices, and for transport of responses to the requests from the target devices in the plurality of target devices to the host devices in the plurality of host devices, where the transport-level protocol issues congestion notifications when any of the host devices in the first plurality of host devices or any of the target devices in the second plurality of target devices becomes congested, a method for reducing congestion includes, on receipt of a current request to (a) write data to one of the target devices in the plurality of target devices, or (b) read data from a target device in the plurality of target devices for return to one of the host devices in the plurality of host devices, (A) determining whether a congestion state already exists at (a) the one of the target devices to which the request to write data is directed, or (b) the one of the host devices to which data from the request to read data is to be returned, (B) when a congestion state already exists, comparing current depth of a queue of (1) write requests to the one of the target devices, or (2) read requests for return to the one of the host devices, to a maximum permissible queue depth, and (C) when the current depth of the queue of (i) write requests to the one of the target devices, or (ii) read requests for return to the one of the host devices, exceeds the maximum permissible queue depth, returning the request to the caller (the SCSI mid-layer or NVMe layer within the host storage stack) with a "retriable" status code. As used in the remainder of this description, and in the claims which follow, returning a request with a "retriable" status code will be referred to as "rejecting" the request, and the term "rejecting" does not signify that the request cannot be processed.

A first implementation of such a method may further include, when the request is not rejected (A) incrementing a current queue depth of (a) the one of the target devices to which the request to write data is directed, or (b) the one of the host devices to which data from the request to read data is to be returned, and (B) adjusting a maximum observed queue depth of (a) the one of the target devices to which the request to write data is directed, or (b) the one of the host devices to which data from the request to read data is to be returned.

According to a first aspect of that first implementation, adjusting the maximum observed queue depth may include setting the maximum observed queue depth to a larger one of (a) the current queue depth, and (b) a previous maximum observed queue depth during a current time interval.

According to a second aspect, that first implementation may further include, on receiving a congestion notification when a congestion state does not yet exist, (A) setting a baseline queue depth equal to the maximum observed queue depth, and (B) setting the maximum permissible queue depth to the baseline queue depth, reduced by a coarse reduction factor.

A first instance of that second aspect may further include, on receiving a congestion notification when the congestion state already exists and congestion is not decreasing, further reducing the maximum permissible queue depth by the coarse reduction factor.

In a variant of that first instance, the further reducing may be limited by a minimum queue depth value.

A second instance of that second aspect may further include, on receiving a congestion notification when the congestion state already exists but congestion had been decreasing, reducing the maximum permissible queue depth by a predetermined fine reduction amount.

A variant of that second instance may further include, after not receiving a congestion notification during a predetermined interval, increasing the maximum permissible queue depth by the fine reduction amount. Increasing the maximum permissible queue depth may be limited by the baseline queue depth.

A third instance of that second aspect may further include, after not receiving a congestion notification during a predetermined interval, increasing the maximum permissible queue depth by a predetermined increment.

In accordance with implementations of the subject matter of this disclosure, a storage area network includes a first plurality of host devices, a second plurality of target devices, and a network fabric operating in accordance with a transport-level protocol to interconnect the first plurality of host devices and the second plurality of target devices, for transport of requests from host devices in the first plurality of host devices to target devices in the second plurality of target devices, and for transport of responses to the requests from the target devices in the plurality of target devices to the host devices in the plurality of host devices. The network fabric includes at least one transport-level switch, the transport-level switch being configured according to the transport-level protocol to issue congestion notifications when any of the host devices in the first plurality of host devices or any of the target devices in the second plurality of target devices becomes congested, and each of the host devices in the plurality of host devices is configured to control congestion on the network fabric by, on receipt of a current request to (a) write data to one of the target devices in the plurality of target devices, or (b) read data from a target device in the plurality of target devices for return to one of the host devices in the plurality of host devices, (A) determining whether a congestion state already exists at (a) the one of the target devices to which the request to write data is directed, or (b) the one of the host devices to which data from the request to read data is to be returned, (B) when a congestion state already exists, comparing current depth of a queue of (1) write requests to the one of the target devices, or (2) read requests for return to the one of the host devices, to a maximum permissible queue depth, and (C) when the current depth of the queue of (i) write requests to the one of the target devices, or (ii) read requests for return to the one of those devices, exceeds the maximum permissible queue depth, rejecting the request.

In a first implementation of such a storage area network, each of the host devices in the plurality of host devices may be further configured to, when the request is not rejected, (A) increment a current queue depth of (a) the one of the target devices to which the request to write data is directed, or (b) the one of the host devices to which data from the request to read data is to be returned, and (B) adjust a maximum observed queue depth of (a) the one of the target devices to which the request to write data is directed, or (b) the one of the host devices to which data from the request to read data is to be returned.

According to a first aspect of that first implementation, each of the host devices in the plurality of host devices may be further configured to adjust the maximum observed queue depth by setting the maximum observed queue depth to a larger one of (a) the current queue depth, and (b) a previous maximum observed queue depth during a current time interval.

According to a second aspect of that first implementation, each of the host devices in the plurality of host devices may be further configured to, on receiving a congestion notification when a congestion state does not yet exist, set a baseline queue depth equal to the maximum observed queue depth, and set the maximum permissible queue depth to the baseline queue depth, reduced by a coarse reduction factor.

In a first instance of that second aspect, each of the host devices in the plurality of host devices may be further configured to, on receiving a congestion notification when the congestion state already exists and congestion is not decreasing, further reduce the maximum permissible queue depth by the coarse reduction factor.

In a variant of that first instance, each of the host devices in the plurality of host devices may be further configured to limit the further reducing of the maximum permissible queue depth by a minimum queue depth value.

In a second instance of that second aspect, each of the host devices in the plurality of host devices may be further configured to, on receiving a congestion notification when the congestion state already exists but congestion had been decreasing, reduce the maximum permissible queue depth by a predetermined fine reduction amount.

In a first variant of that second instance, each of the host devices in the plurality of host devices may be further configured to, after not receiving a congestion notification during a predetermined interval, increase the maximum permissible queue depth by the fine reduction amount.

According to that first variant, each of the host devices in the plurality of host devices may be further configured to limit the increasing of the maximum permissible queue depth by the baseline queue depth.

In a third instance of that second aspect, each of the host devices in the plurality of host devices may be further configured to, after not receiving a congestion notification during a predetermined interval, increase the maximum permissible queue depth by a predetermined increment.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

Figure 1:
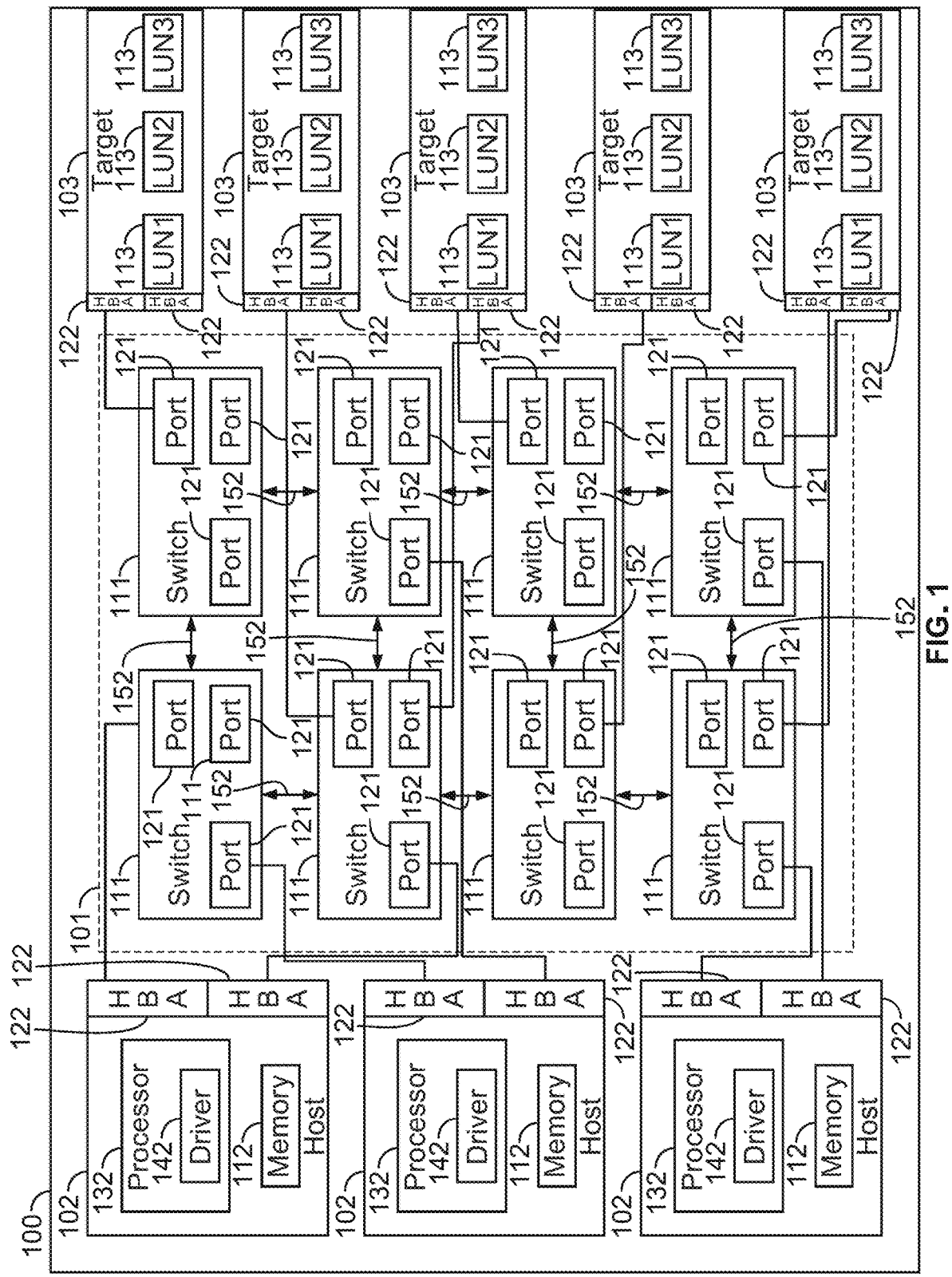
FIG. 1 is a simplified representation of a storage area network that may incorporate implementations of the subject matter of this disclosure.

As noted above, a storage area network (SAN) may connect a plurality of host devices to a plurality of "target" storage devices over a set of physical switches and interconnects that together act as a "fabric" (i.e., a logical entity that monitors the SAN). While each target device may be a single physical device occupying a single port on the SAN, the target device may include a plurality of physical storage units (e.g., hard disk drives) within a single housing, or a single physical storage unit with a plurality of partitions, where each physical storage unit or partition constitutes a separate logical unit or namespace. Transfer of IUs between a host device and a logical unit or namespace connected to a SAN may be accomplished by packing and unpacking the IUs and transporting them from the source to the destination through multiple storage protocol layers. For example, a read/write request originating from an application may first be routed to a higher storage protocol layer of the SAN— e.g., the "block (upper)" layer of the SCSI (Small Computer System Interface) or NVMe (Non-Volatile Memory Express) protocols, where information regarding which location of the physical medium (e.g., hard disk or solid-state drive (SSD)) the data is to be read from or written to is determined and encoded. This "package" is passed to a middle layer, which might determine how many paths exist to the target device exist, and then select one of those paths and pass the package down to a separate transport-level protocol layer—e.g., a Fibre Channel or iSCSI (Internet Small Computer System Interface) layer which might be responsible for transporting the IU across the SAN to the destination target device. At the target device, the IU package then gets unpacked by the lower transport layer and handed over to the upper layer of the SCSI protocol. The upper layer decodes the read/write request and the physical location (from which data is to be read or to which data is to be written), processes the request, and returns the status and or data back across the various layers of the storage protocol to the requestor at the host.

Typical flow controls operate at the upper/middle application layer of the storage protocol, and limit transport of IUs between a host and a logical unit (or namespace) that is congested (or vice-versa). However, even if no logical unit or namespace in a target device is congested, so that no limits are placed on IU transport at the upper/middle layers of the storage protocol, a target device as a whole may be congested. For example, all logical units (or namespaces) in a particular target device may be operating just under the congestion threshold, so that the target device in the aggregate is congested, even though no individual logical unit (or namespace) in the target device is congested and there are no IU transport restrictions in place at the application layers of the storage protocol. The effect could be to back up data traffic onto the switch to which the congested target device is coupled, which could cause congestion for all traffic passing through that switch, even between initiators and targets that are not themselves congested, which could affect the SAN fabric as a whole.

Specifically, network congestion may occur when data packets or frames enter a fabric faster than they exit the fabric, leading to a buildup, at switches of the fabric, of frames awaiting transmission. Such backups can occur on a device link (i.e., a link between a switch and a target or initiator device) as well as on an inter-switch link (ISL; a link between two switches).

Additionally, both initiators and targets can become congested. A target, such as a storage device, may be unable to process requests to read or, especially, write data as fast as the requests are made. But even an initiator, such as a host computer, may be unable to process requested data as fast as it is returned. This may happens because of a speed mismatch between an initiator and a target. For example, if a host is operating at one speed, and a target is operating at a higher speed, the host could become congested when requested data is returned by the target. Or, if a host is interacting concurrently with multiple targets that operate at the same (or even lower) speed as the host, the host may get congested if data is received from several targets at once.

Back pressure from a congested initiator in the fabric can also cause traffic to slow down on upstream ISLs, just as in case of a congested target device. Such "congestion spreading" can cause traffic from unrelated data flows (e.g., between other initiators and targets that are not congested) that use the same ISL to slow down.

Congestion can be caused, for example, by lost buffer credits, credit-stalling or oversubscription. While many storage protocols (including, e.g., Fibre Channel) may include mechanisms to recover lost buffer credits, there have not heretofore been standardized solutions for mitigating congestion caused by credit-stalling or oversubscription.

However, many storage area network protocols, including Fibre Channel, are now capable of monitoring the fabric and issuing performance notifications when a particular endpoint (i.e., a target or initiator) is congested. In accordance with implementations of the subject matter of this disclosure, such notifications (referred to in Fibre Channel, e.g., as Fabric Performance Impact Notifications, or FPINs, which may be issued by a combination of initiators, targets and switches) may be used to trigger a process to control the number of requests sent to or from a congested resource, as described below. By reacting to such notifications, implementations of the subject matter of this disclosure avoid "hot pockets" in the SAN, caused by individual endpoints, that adversely affect multiple other endpoints (by causing excessive timeouts and retries). By being cognizant of congestion at a particular endpoint, and reducing the load at that endpoint, congestion and negative performance on the overall SAN can be reduced or nearly eliminated.

In accordance with implementations of the subject matter of this disclosure, when a congestion notification (e.g., an FPIN) is first received for a particular node, a baseline queue count is established. The baseline may be set, in some implementations, to the then-current request queue count (because that is the level that triggered a congestion notification) or, alternatively, to a predetermined baseline count value.

Once the baseline has been set (in one or both directions) for a particular node or endpoint for which a congestion notification has been issued, the current queue for that node (in that direction or both directions) continues to be monitored. To reduce congestion (given that a congestion notification has already been issued), a new maximum queue target, or maximum permissible queue value or depth, may be set by reducing the baseline queue count by applying a multiplicative factor less than 1 (or alternatively, the maximum queue target may initially be set to the current queue count, without reduction). The reduction factor may be relatively coarse—e.g., 0.5—but may be implementation-dependent. In other implementations, a subtractive decrement value (i.e., a set number of counts) may be applied instead of a multiplicative factor.

If further operations increase the current queue count above the maximum as thereby set, the number of requests directed to that node may throttled down, by returning any incoming request to the initiator of the request, with an instruction to retry the request at a later time.

A node that has been throttled down may be monitored for a predetermined period or interval, which may be on the order of seconds or even minutes (e.g., up to three minutes). If during the predetermined period additional congestion notifications (e.g., FPINs) are issued for the node, the maximum queue target may be further reduced by the predetermined reduction factor (or decrement amount), further throttling down requests to that node. In some implementations, however, there is a minimum value below which the maximum queue target will not be reduced no matter how many further congestion notifications are issued. The minimum value may be determined empirically, and may be set administratively as, e.g., a fraction or percentage of the baseline value described above.

If no new congestion notifications are received during the predetermined period after requests for a node have been throttled down, then the node may be throttled back up by a predetermined increment, which generally will result in a smaller change than the reduction factor (unless the maximum queue depth is very small because the congestion had been severe. If, in successive predetermined periods, there continue to be no new congestion notifications, then in each successive period the maximum queue target may be raised by the predetermined increment until the maximum queue target is equal to the baseline queue count, and the node is then designated as no longer congested.

However, if while a node is throttling up a new congestion notification is received, the maximum queue target may be lowered again. The amount by which the maximum queue target, for a node that is being throttled up, may be lowered in the face of new congestion may be the same as during the throttling-down phase—i.e., the predetermined reduction factor (or decrement) referred to above, or may be a smaller "fine reduction" value. For example, the fine reduction value may be the same as the predetermined increment (but with the opposite sign) used in the throttling-up stage, or another smaller value.

The various reduction factors, increment amounts and decrement amounts may be configurable. For example, a mission-critical server may have a higher priority than an e-mail server, while backup servers may have the lowest priority. A higher-priority device may be assigned lower reduction amounts and a higher increment amounts than lower-priority devices.

As noted above, if the maximum queue target is throttled back up to the baseline value, the congested state of the node may be cleared by the device that issued the FPIN. The congested state also may be cleared by an external command, or if no new congestion notifications are received within a predetermined multiple of the predetermined period, even if the maximum queue target has not been throttled back up to the baseline value by then.

Although, as discussed above, congestion notifications may be issued by the transport fabric (e.g., Fibre Channel), and in accordance with implementations of the subject matter of this disclosure such notifications may be used to trigger a process to control the number of requests sent to or from a congested resource, the transport fabric hardware has insufficient computing power to perform that process once triggered. Instead, each host device may perform the process separately through respective transport layer drivers in each host.

Thus, while at the storage control layer (e.g., SCSI or NVMe), each host tracks only requests that it initiated, the situation is different at the transport protocol layer, where each host has a transport layer driver that may monitor each node and maintain a count of queued requests in each direction at each node (i.e., a queue at each host of unprocessed returned data based on requests initiated by the host, and a queue at each target device based on requests sent to that target device by any host). The transport layer driver in each host also receives the congestion notifications for each target device in the fabric, whether or not that particular host has any outstanding requests to a particular target for which a congestion notification is issued. Using that information, each host separately determines when requests to a particular target need to be throttled down, or can be throttled up. Generally, if a target is congested, it will be considered congested by all hosts, but the degree of throttling applied by each host may differ, depending on the profile configured on each host (which may determine the priority of the application being run).

Figure 2:
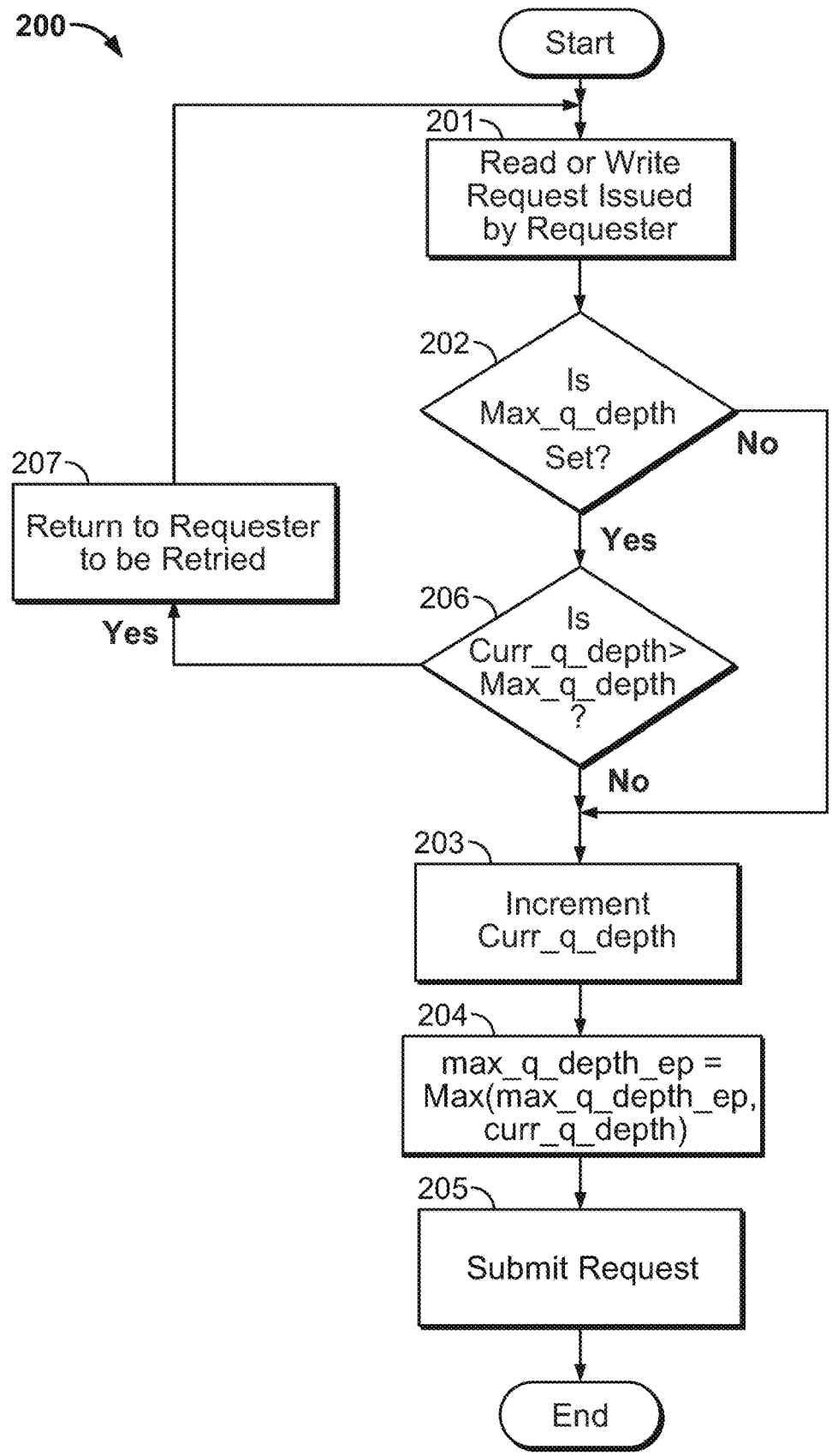
FIG. 2 is a flow diagram illustrating a method in accordance with implementations of the subject matter of this disclosure.
Figure 3:
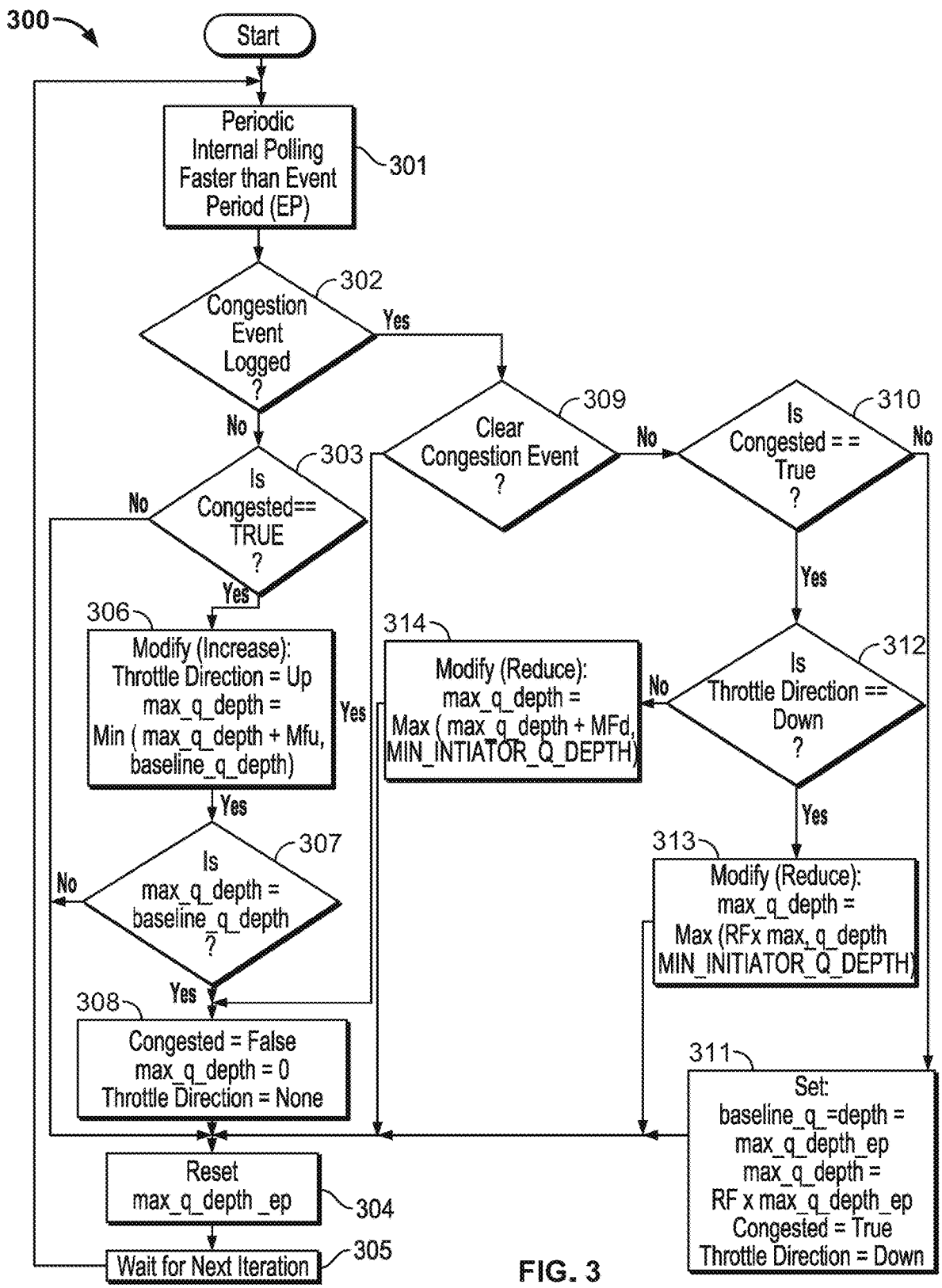
FIG. 3 is a flow diagram illustrating a method in accordance with implementations of the subject matter of this disclosure for determining variables used in the method diagrammed in FIG. 2.

The subject matter of this disclosure may be better understood by reference to FIGS. 1-3.

FIG. 1 is a simplified representation of a storage area network (SAN) 100 that may incorporate implementations of the subject matter of this disclosure. SAN 100 includes an array 101 of linked switches 111. Each switch 111 may be capable of operating according to a storage transport protocol such as Fibre Channel, including the ability to send congestion notifications regarding attached nodes. Each such transport-level switch 111 may have a plurality of ports 121, to which nodes such as hosts 102 and "target" storage devices 103, as well as inter-switch links (ISLs) 152, may be coupled.

Each host device 102 may be coupled to the transport layer of SAN 100 by one or more host bus adapters 122. If there is more than one host bus adapter 122 in a host device 102, then in at least some implementations, each respective host bus adapter 122 may manage the link of its host device 102 to a respective subset of target devices 103. Each host device 102 may further include at least one processor 132, executing a driver 142 that implements a method as described above, and in more detail below, for determining in accordance with implementations of the subject matter of this disclosure whether and when to throttle requests to a particular target device. Driver 142 may also determine, in some implementations, to throttle host device 102 itself—i.e., to stop host device 102 from making data requests to target devices—in situations where a host device 102 is itself congested (i.e., is unable to process all of the data being returned in response to previous requests).

While each host device 102 may have more than one host bus adapter 122, in most implementations, one driver 132 on each host device 102 may be expected to execute the throttling method for all host bus adapters 122 on its respective host device 102.

As in the case of host devices 102, each target device 103 is coupled to the fabric via a host bus adapter with multiple ports. Each target storage device 103 may include one or more logical storage units (LUNs) 113. Each LUN 113 may be a separate drive device—e.g., hard disk drive (HDD) or solid-state drive (SSD)—or a separate partition of a single drive device, or a combination thereof. Any particular logical unit (LUN) 113 could be presented or exposed via a plurality of target ports via one or more of host bus adapters 122. A queue of unprocessed requests for each target storage device 103 may be maintained in the fabric (e.g., switches 111). Each host device 102 maintains one other queue—a queue of data, returned to host device 102 in response to read requests that it initiated, that the host device 102 itself has not been able to process.

Implementations of methods in accordance with the subject matter of this disclosure may be understood by reference to the flow diagrams in FIGS. 2 and 3. In some implementations, method 200 of FIG. 2 is performed as part of the driver's performance path where the middle "application" layer may invoke a routine at a high rate (e.g., millions of times per second), while method 300 of FIG. 3 is performed as a background housekeeping task, which may be performed at a lower frequency (e.g., in the range of once per second to tens of times per second) to conserve system resources.

Method 200 begins at 201 where a read or write request is issued by a requester application—i.e., method 200 is performed separately for each request to a device, whether it is a read request to a target device, or a write request to a target device (a requester application or process within a host 102 may originate a read request or a write request from or to a target device 103). At 202, it is determined whether or not a maximum queue depth (max_q_depth) has previously been set for the target device at which the request is directed or for the initiator of the request. If max_q_depth has not previously been set, then throttling for that device is not in effect, and at 203 the current queue depth (curr_q_depth) for that device is incremented. At 204, the maximum recorded or observed queue depth for the current period (max_q_depth ep) is set to the larger of the previous max_q_depth ep and the new curr_q_depth, and at 205 the request is sent to the SAN fabric.

If at 202 max_q_depth has previously been set (see FIG. 3), then throttling for that device is already in effect (depending on the nature of the congestion, throttling of a device may be in effect for read requests only, write requests only, or both types of requests). In that case, it is determined at 206 whether the curr_q_depth exceeds the max_q_depth. If so, the request is rejected and is returned to the requester at 207 to be retried. If at 206, the curr_q_depth does not exceed the max_q_depth, then the request can be fulfilled even though throttling is in effect and flow advances to 203 and proceeds as described above.

Rejection of a request at 206 is based, as noted, on comparison of curr_q_depth to max_q_depth. An implementation of a method 300, in accordance with the subject matter of this disclosure, for adjusting the value of max_q_depth in response to changes in the congestion state, is diagrammed in FIG. 3.

Method 300 is initiated periodically at 301, separately by each host and separately for each queue in the system as noted above (i.e., method 300 is performed separately for each device queue, whether it is an initiator device queue, or a target device queue). Initiation of method 300 is at least as frequent as the predetermined period referred to above, and presupposes that congestion events (e.g., issuance of an FPIN) are logged when they occur. At 302, it is determined whether a congestion event has been logged since the previous iteration of method 300 for the current queue. If not, then at 303 it is determined whether or not the system is already in a congestion state (e.g., from a previous iteration). If not—i.e., if the system is not already in a congestion state and no new congestion event has been logged—then at 304 max_q_depth ep (the max_q_depth for the current period) is reset to '0' (in this scenario it is already at '0') and at 305 the system waits for the next iteration.

If at 303 it is determined that the system is already in a congestion state, then, because at 302 there was no new congestion event, that means that the queue in question can be throttled up (i.e., throttling can be reduced) by increasing max_q_depth. In this implementation, at 306, the throttling direction is set to 'up' and max_q_depth is increased at 306 to the smaller of (a) the most recent value of max_q_depth plus the increment amount (described above), and (b) the baseline queue depth (because the most recent value of max_q_depth might be close enough to the baseline queue depth that applying the increment amount might increase max_q_depth above the baseline value).

After max_q_depth has been increased at 306, then at 307 it is determined whether max_q_depth is equal to the baseline queue depth. If not, the congested state remains in effect and at 304 max_q_depth ep is reset to '0' (in this scenario it is already at '0') and at 305 the system waits for the next initiation. But if at 307 it is determined that max_q_depth is equal to the baseline queue depth, then at 308 the congested state is removed, the throttling direction is set to 'none', and max_q_depth is set to '0'. Flow then proceeds to 304 where max_q_depth ep is reset to '0' and at 305 the system waits for the next iteration.

If at 302 a congestion event was logged, then at 309 it is determined whether a "clear congestion" command has been received. If so, flow advances to 308 and proceeds as described in the preceding paragraph. But if at 309 no "clear congestion" command has been received, then at 310 it is determined whether the system is already in a congested state (from a previous iteration). If not, meaning that this is the first congestion event detected, then at 311, the state is changed to "congested," the throttling direction is set to 'down', the baseline queue depth is set to the value of max_q_depth ep (which is the current queue depth given that this is the first iteration in which a congested state is entered), and the max_q_depth is set to the value of max_q_depth ep (i.e, the baseline queue depth which has just been set) multiplied by the reduction factor (RF) described above. Flow then proceeds to 304 where max_q_depth ep is reset to '0' and at 305 the system waits for the next iteration.

If at 310 the system is already in a congested state (from a previous iteration), then at 312 it is determined whether the throttle direction is 'down' meaning congestion has not improved since entering the congestion state, and if so then at 313 the max_q_depth is further reduced to the larger of (a) the current max_q_depth multiplied by the reduction factor (RF), and (b) the minimum queue depth (min_q_depth), which is a configurable value. That is, max_q_depth is not reduced below min_q_depth no matter how bad the congestion becomes. Flow then proceeds to 304 where max_q_depth ep is reset to '0' and at 305 the system waits for the next iteration.

If at 312 the throttle direction is not 'down', (i.e., it is 'up'), meaning congestion had been improving and the queue was being throttled back up, then at 314 the max_q_depth is further reduced to the larger of (a) the current max_q_depth less the "fine reduction" value described above, and (b) the minimum queue depth (min_q_depth). That is, the queue is throttled down again, but by a smaller amount than before congestion had begun to improve, and still not to a value below the minimum queue depth. Flow then proceeds to 304 where max_q_depth ep is reset to '0' and at 305 the system waits for the next iteration.

Thus it is seen that reduction of congestion in a storage area network caused by individual resources, by controlling the number of requests that may be directed to an individual resource, has been provided.

As used herein and in the claims which follow, the construction "one of A and B" shall mean "A or B."

It is noted that the foregoing is only illustrative of the principles of the invention, and that the invention can be practiced by other than the described embodiments, which are presented for purposes of illustration and not of limitation, and the present invention is limited only by the claims which follow.

What is claimed is:

1. In a storage area network including a first plurality of host devices, a second plurality of target devices, and a network fabric operating in accordance with a transport-level protocol to interconnect the first plurality of host devices and the second plurality of target devices, for transport of requests from host devices in the first plurality of host devices to target devices in the second plurality of target devices, and for transport of responses to the requests from the target devices in the plurality of target devices to the host devices in the plurality of host devices, where the transport-level protocol issues congestion notifications when any of the host devices in the first plurality of host devices or any of the target devices in the second plurality of target devices becomes congested, a method for reducing congestion, the method comprising:
   on receipt of a current request to (a) write data to one of the target devices in the plurality of target devices, or (b) read data from a target device in the plurality of target devices for return to one of the host devices in the plurality of host devices:
   determining whether a congestion state already exists at (a) the one of the target devices to which the request to write data is directed, or (b) the one of the host devices to which data from the request to read data is to be returned;
   when a congestion state already exists, comparing current depth of a queue of (1) write requests to the one of the target devices, or (2) read requests for return to the one of the host devices, to a maximum permissible queue depth;
   when the current depth of the queue of (i) write requests to the one of the target devices, or (ii) read requests for return to the one of the host devices, exceeds the maximum permissible queue depth, rejecting the request; and
   when the request is not rejected:
   incrementing a current queue depth of (a) the one of the target devices to which the request to write data is directed, or (b) the one of the host devices to which data from the request to read data is to be returned, and
   adjusting a maximum observed queue depth of (a) the one of the target devices to which the request to write data is directed, or (b) the one of the host devices to which data from the request to read data is to be returned, to a larger one of (c) the current queue depth, and (d) a previous maximum observed queue depth during a current time interval.

2. The method of claim 1 further comprising, on receiving a congestion notification when a congestion state does not yet exist:
   setting a baseline queue depth equal to the maximum observed queue depth; and
   setting the maximum permissible queue depth to the baseline queue depth, reduced by a coarse reduction factor.

3. The method of claim 2 further comprising, on receiving a congestion notification when the congestion state already exists and congestion is not decreasing:
   further reducing the maximum permissible queue depth by the coarse reduction factor.

4. The method of claim 3 wherein the further reducing is limited by a minimum queue depth value.

5. The method of claim 2 further comprising, on receiving a congestion notification when the congestion state already exists but congestion had been decreasing:
   reducing the maximum permissible queue depth by a predetermined fine reduction amount.

6. The method of claim 5 further comprising, after not receiving a congestion notification during a predetermined interval, increasing the maximum permissible queue depth by the fine reduction amount.

7. The method of claim 6 wherein increasing the maximum permissible queue depth is limited by the baseline queue depth.

8. The method of claim 2 further comprising, after not receiving a congestion notification during a predetermined interval, increasing the maximum permissible queue depth by a predetermined increment.

9. A storage area network comprising:
   a first plurality of host devices;
   a second plurality of target devices; and
   a network fabric operating in accordance with a transport-level protocol to interconnect the first plurality of host devices and the second plurality of target devices, for transport of requests from host devices in the first plurality of host devices to target devices in the second plurality of target devices, and for transport of responses to the requests from the target devices in the plurality of target devices to the host devices in the plurality of host devices, wherein:
   the network fabric comprises at least one transport-level switch, the transport-level switch being configured according to the transport-level protocol to issue congestion notifications when any of the host devices in the first plurality of host devices or any of the target devices in the second plurality of target devices becomes congested; and
   each of the host devices in the plurality of host devices is configured to control congestion on the network fabric by:
   on receipt of a current request to (a) write data to one of the target devices in the plurality of target devices, or (b) read data from a target device in the plurality of target devices for return to one of the host devices in the plurality of host devices:
   determining whether a congestion state already exists at (a) the one of the target devices to which the request to write data is directed, or (b) the one of the host devices to which data from the request to read data is to be returned;

when a congestion state already exists, comparing current depth of a queue of (1) write requests to the one of the target devices, or (2) read requests for return to the one of the host devices, to a maximum permissible queue depth;

when the current depth of the queue of (i) write requests to the one of the target devices, or (ii) read requests for return to the one of the host devices, exceeds the maximum permissible queue depth, rejecting the request; and when the request is not rejected:

incrementing a current queue depth of (a) the one of the target devices to which the request to write data is directed, or (b) the one of the host devices to which data from the request to read data is to be returned; and adjusting a maximum observed queue depth of (a) the one of the target devices to which the request to write data is directed, or (b) the one of the host devices to which data from the request to read data is to be returned, by setting the maximum observed queue depth to a larger one of (c) the current queue depth, and (d) a previous maximum observed queue depth during a current time interval.

10. The storage area network of claim 9 wherein each of the host devices in the plurality of host devices is further configured to, on receiving a congestion notification when a congestion state does not yet exist:

set a baseline queue depth equal to the maximum observed queue depth; and set the maximum permissible queue depth to the baseline queue depth, reduced by a coarse reduction factor.

11. The storage area network of claim 10 wherein each of the host devices in the plurality of host devices is further configured to, on receiving a congestion notification when the congestion state already exists and congestion is not decreasing:

further reduce the maximum permissible queue depth by the coarse reduction factor.

12. The storage area network of claim 3 wherein each of the host devices in the plurality of host devices is further configured to limit the further reducing of the maximum permissible queue depth by a minimum queue depth value.

13. The storage area network of claim 10 wherein each of the host devices in the plurality of host devices is further configured to, on receiving a congestion notification when the congestion state already exists but congestion had been decreasing:

reduce the maximum permissible queue depth by a predetermined fine reduction amount.

14. The storage area network of claim 13 wherein each of the host devices in the plurality of host devices is further configured to, after not receiving a congestion notification during a predetermined interval, increase the maximum permissible queue depth by the fine reduction amount.

15. The storage area network of claim 14 wherein each of the host devices in the plurality of host devices is further configured to limit the increasing of the maximum permissible queue depth by the baseline queue depth.

16. The storage area network of claim 10 wherein each of the host devices in the plurality of host devices is further configured to, after not receiving a congestion notification during a predetermined interval, increase the maximum permissible queue depth by a predetermined increment.

* * * * *